(12) United States Patent
Sugiura et al.

(10) Patent No.: US 7,993,696 B2
(45) Date of Patent: Aug. 9, 2011

(54) CONTAINER-PACKED BEVERAGE CONTAINING VEGETABLE JUICE AND/OR FRUIT JUICE

(75) Inventors: Yoko Sugiura, Sumida-ku (JP); Hiroyuki Sugaya, Sumida-ku (JP)

(73) Assignee: Kao Corporation, Tokyo (JP)

( * ) Notice: Subject to any disclaimer, the term of this patent is extended or adjusted under 35 U.S.C. 154(b) by 719 days.

(21) Appl. No.: 11/993,690

(22) PCT Filed: Jun. 23, 2006

(86) PCT No.: PCT/JP2006/312647
§ 371 (c)(1),
(2), (4) Date: Dec. 21, 2007

(87) PCT Pub. No.: WO2006/137537
PCT Pub. Date: Dec. 28, 2006

(65) Prior Publication Data
US 2010/0151088 A1  Jun. 17, 2010

(30) Foreign Application Priority Data

Jun. 24, 2005  (JP) .................................. 2005-185480
Jun. 24, 2005  (JP) .................................. 2005-185482

(51) Int. Cl.
*A23L 2/02* (2006.01)
(52) U.S. Cl. ........ 426/615; 426/106; 426/115; 426/481; 426/599; 426/661
(58) Field of Classification Search .................. 426/615, 426/599, 661, 481, 115, 106
See application file for complete search history.

(56) References Cited

U.S. PATENT DOCUMENTS

| | | | |
|---|---|---|---|
| 2005/0272836 A1* | 12/2005 | Yaginuma et al. ............... | 524/27 |
| 2007/0154615 A1* | 7/2007 | Kubo et al. ..................... | 426/599 |
| 2008/0153939 A1* | 6/2008 | Schmidt et al. ............... | 523/100 |
| 2009/0233865 A1* | 9/2009 | Kume et al. ..................... | 514/12 |

FOREIGN PATENT DOCUMENTS

| | | |
|---|---|---|
| JP | 07-123934 | 5/1995 |
| JP | 11 262379 | 9/1999 |
| JP | 2002-051755 | 2/2002 |
| JP | 2002-078469 | 3/2002 |
| JP | 2002 78469 | 3/2002 |
| JP | 2002-291453 | 10/2002 |
| JP | 2003 12537 | 1/2003 |
| WO | 2005 063054 | 7/2005 |

OTHER PUBLICATIONS

Marketing Report: Thickening Agent, "Food Processing and Ingredients", vol. 31, No. 7, pp. 32-35 (with partial English translation).
U.S. Appl. No. 11/917,686, filed Dec. 14, 2007, Sugiura, et al.
U.S. Appl. No. 11/993,228, filed Dec. 20, 2007, Sugiura, et al.
U.S. Appl. No. 11/908,304, filed Sep. 11, 2007, Sugiura, et al.

* cited by examiner

*Primary Examiner* — Helen F Heggestad
(74) *Attorney, Agent, or Firm* — Oblon, Spivak, McClelland, Maier & Neustadt, L.L.P.

(57) ABSTRACT

Provided is a packaged beverage which can be discharged from the beverage container uniformly because precipitates containing effective components derived from vegetables or fruits can be dispersed quickly by mild shaking, though the formation of precipitates during long-term storage is allowed from the viewpoint of incorporating the effective components in the beverage without damaging them; is excellent in desorption and re-dispersibility of the precipitates; and is easy to drink.

A packaged beverage contains a vegetable juice and/or a fruit juice, which contains the following components (A) to (D):
(A) from 0.5 to 12 wt. % of polydextrose,
(B) from 0.5 to 12 wt. % of (b1) indigestible dextrose or (b2) a degraded guar gum,
(C) from 2 to 30 vol. % of an insoluble solid, and
(D) 50 wt. % or greater of water; and satisfying the following conditions:
(1) $((A)+(b1))/(C) \leqq 8$ (wt. %/vol. %) or $((A)+(b2))/(C) \leqq 3.4$ (wt. %/vol. %)
(2) pH after heat sterilization: from 3 to 5, and
(3) viscosity after heat sterilization: 300 mPa·s or less.

6 Claims, No Drawings

# CONTAINER-PACKED BEVERAGE CONTAINING VEGETABLE JUICE AND/OR FRUIT JUICE

FIELD OF THE INVENTION

The present invention relates to a packaged beverage containing a vegetable juice and/or a fruit juice, which enables a good sensation to arise upon drinking and is excellent in both the desorption of precipitates from the beverage container and the re-dispersibility of precipitates.

BACKGROUND OF THE INVENTION

Unbalanced nutrition is one of the risk factors leading to life-style related diseases, so it is important to keep nutrition balance adequate, for a healthy life. It is also becoming evident that sufficient intakes of vegetables and fruits have an effective role in improvement of such unbalanced nutrition. In Japan, the targeted daily intake of vegetables is 350 g per day (reference value: 292 g, according to the national nutrition survey in 1997), as recommended by "National Health Promotion Strategy for the 21st Century (Health Japan 21)". The amount of vegetable consumption, however, is showing a downward tendency after year 1995 when the consumption hit a peak. For instance, the amount of the household vegetable consumption in 1998 is a meager 260 g per day, and the amount of consumed green and yellow vegetables in the same year is a meager 90 g per day. These amounts fall short of the targeted ones. Under such circumstances, it is deemed increasingly important not only to intake crude vegetables, but also to supplementally intake a vegetable juice or the like.

Vegetables or fruits processed into juice have insoluble solids rich in effective components such as carotenoids and minerals. Incorporation of a large amount of such insoluble solids in a beverage could lead to vast numbers of precipitates originated from vegetables and fruits. The formation of such precipitates raised a problem characterized in that insoluble solids containing effective components derived from vegetables and fruits adhere to the wall surface of the beverage container, and such adherents do not easily fall off from the wall surface even by shaking, leading to the impossibility of elimination of said precipitates.

Thus the largest problem with a beverage containing a vegetable juice or fruit juice lies in the fact that a large amount of precipitates is inevitable, so the traditionally existing technologies have centered on prevention of the formation of precipitates.

For example, there is a proposed technology which includes adding agar to a beverage as a dispersing method of insoluble solids contained therein (Patent Document 1). According to this technology, the dispersed state of the insoluble solids in the beverage can be maintained by the addition of from 0.001 to 0.5 wt. % of agar thereto so that the beverage can have a uniform content over the drinking time without shaking or stirring. Nonetheless, this technology has the drawback that even if a uniform dispersed state can be maintained after long-term storage by the use of agar, the beverage inevitably has gel-like physical properties.

There is also a proposed method which includes preparing a jelly drink by incorporating a mixture of gellan gum and pectin or a mixture of agar and locust bean gum as an irreversible gelling agent (Patent Document 2). According to this technology, formation of precipitates can be prevented completely by gelation of the beverage. Nonetheless, such a technology has a drawback in that it becomes a jelly-like beverage and provides palatability utterly different from that of the conventional vegetable beverage or vegetable/fruit mix juice.

There is also a proposed technology which includes using a thickener such as agar, xanthan gum or tara gum for improving the dispersion stability of a bean-curd refuse paste in a bean-curd refuse beverage (Patent Document 3). Although this technology is capable of preventing the formation of precipitates, there is an inherent problem that the mixing amount of the thickener cannot be determined freely because a gelation region appears depending on the mixing concentration.

Thickeners such as pectin, xanthan gum and gelatin are used popularly in order to improve stability of a precipitable food material such as vegetable juice and fruit juice as described above (Non-patent Document 1). They impair the palatability, that is, an important factor in beverage, though having effects on the prevention of the formation of precipitates.

[Patent Document 1] JP-A-7-123934
[Patent Document 2] JP-A-2002-291453
[Patent Document 3] JP-A-2002-51755
[Non-patent Document 1] *Food Processing and Ingredients*, 31(7), 32-35.

DISCLOSURE OF THE INVENTION

In the present invention, there is provided a packaged beverage containing a vegetable juice and/or a fruit juice, which contains the following components (A) to (D):
(A) from 0.5 to 12 wt. % of polydextrose,
(B) from 0.5 to 12 wt. % of (b1) indigestible dextrin or (b2) a degraded guar gum,
(C) from 2 to 30 vol. % of an insoluble solid, and
(D) 50 wt. % or greater of water; and satisfying the following conditions:
(1) $((A)+(b1))/(C) \leqq 8$ (wt. %/vol. %) or $((A)+(b2))/(C) \leqq 3.4$ (wt. %/vol. %),
(2) pH after heat sterilization: from 3 to 5, and
(3) viscosity after heat sterilization: 300 mPa·s or less.

DETAILED DESCRIPTION OF THE INVENTION

The present invention relates to the provision of a packaged beverage which can be discharged from the beverage container uniformly because precipitates containing effective components derived from vegetables or fruits can be dispersed quickly by mild shaking, though the formation of precipitates during long-term storage is allowed from the viewpoint of incorporating the effective components derived from vegetables or fruits in the beverage without damaging them; is excellent in desorption and re-dispersibility of the precipitates; and is easy to drink.

The present inventors prepared a beverage containing a vegetable juice and/or a fruit juice and investigated its taste and storage stability after heat sterilization. As a result, it has been found that use of polydextrose and indigestible dextrin or polydextrose and degraded guar gum in combination and control of the water content, insoluble solid content, and viscosity and pH of the beverage enables improvement of ease of drinking after storage and also improvement of desorption and re-dispersibility of precipitates formed in the container of the packaged beverage.

The beverage containing a vegetable juice and/or a fruit juice according to the present invention is easy to drink and excellent in desorption and re-dispersibility of precipitates containing effective components of the vegetables and fruits after storage. More specifically, it is excellent in desorption of the precipitates from the container and re-dispersibility of them, though it is allowed to form such precipitates; and it is easy to drink.

The packaged beverage containing a vegetable juice and/or a fruit juice according to the present invention can contain squeezed juice of a vegetable and/or squeezed juice of a fruit which is generally thought to cause aggregation and precipitation easily. Examples of the vegetable for obtaining the squeezed juice of a vegetable include tomato, carrot, spinach, cabbage, Brussels sprout, broccoli, cauliflower, celery, lettuce, parsley, watercress, kale, pumpkin, red bell pepper, green pepper and Japanese radish. In the present invention, tomato, carrot, spinach, parsley, celery and cabbage can be used preferably. Aloe can also be used for the squeezed juice of a vegetable.

Examples of the fruit for obtaining the squeezed juice of a fruit include lemon, apple, mandarin orange, orange, peach, melon, watermelon, Japanese plum, kiwifruit, guava and prune. Of these, lemon, apple, mandarin orange, orange and peach are preferred.

The insoluble solid in the packaged beverage containing a vegetable juice and/or a fruit juice according to the present invention can be analyzed in the following method.
(Insoluble Solid Content Analyzing Method)

In a centrifugal precipitation tube for analyzing an insoluble solid content as defined by the insoluble solid analyzing method described in the Test Methods of Japanese Agricultural Standards Association (*Latest Fruit juice•Fruit Drink Dictionary*, ed. by Japan Fruit Juice Association, pp. 566 to 575, published by Asakura Shoten), a 10 mL portion of the packaged beverage containing a vegetable juice and/or a fruit juice according to the present invention is charged. It is centrifuged for exactly 30 minutes in a centrifugal separator having a turning radius of 14.5 cm after the rotation speed of the separator reaches 3000 rpm. From the centrifugal precipitation tube, 5 mL of the supernatant is withdrawn, 5 mL of distilled water is added thereto and then centrifugation is performed for exactly 30 minutes in a centrifugal separator having a turning radius of 14.5 cm after the rotation speed of the separator reaches 3000 rpm. From the centrifugal precipitation tube, 5 mL of the supernatant is withdrawn, 5 ml of distilled water is added thereto and then centrifugation is performed for exactly 30 minutes in a centrifugal separator having a turning radius of 14.5 cm after the rotation speed of the separator reaches 3000 rpm. The above-described operations are carried out at 20° C. The volume of the precipitate from the bottom to the average upper end of the centrifugal precipitation tube rightly after the centrifugal separator stops naturally is designated as the insoluble solid content.

The insoluble solid content in the packaged beverage containing a vegetable juice and/or a fruit juice according to the present invention is preferably from 2 to 30 vol. %, more preferably from 4 to 25 vol. %, even more preferably from 6 to 20 vol. %, even more preferably from 8 to 18 vol. %. When the insoluble solid content is less than 2 vol. %, the packaged beverage containing a vegetable juice and/or a fruit juice cannot have a sufficient effective component. Amounts exceeding 30 vol. %, on the other hand, deteriorate ease of drinking.

The insoluble solid content of the packaged beverage containing a vegetable juice and/or a fruit juice according to the present invention can be adjusted by removing therefrom the insoluble solids through filtration or centrifugal separation when the squeezed juice of a vegetable or fruit contains excessive insoluble solids. When a small amount of insoluble solids or no insoluble solid is contained in the squeezed juice of a vegetable or fruit, the insoluble solid content can be adjusted by the addition of insoluble solids obtained by filtration or centrifugal separation of a squeezed juice of another vegetable and/or fruit. It is also possible to employ, as needed, a preparation process of a tomato/vegetable juice as described in pp. 416-427, *Latest Edition of Soft Drinks* (published on Sep. 30, 2003, ed. by Editorial Committee of Latest Edition of Soft Drinks, published by Korin) or a preparation process of a fruit beverage as described in ibid, pp. 330 to 337.

The packaged beverage containing a vegetable juice and/or a fruit juice according to the present invention has preferably 50 wt. % or greater, more preferably 60 wt. % or greater, even more preferably 70 wt. % or greater of a water content. A water content of less than 50 wt. % will be a cause of deterioration in the ease of drinking or the re-dispersibility of insoluble solids.

The polydextrose, indigestible dextrin and degraded guar gum to be used in the packaged beverage containing a vegetable juice and/or a fruit juice according to the present invention are substances to be analyzed by a Prosky method (enzyme-weight method) or high performance liquid chromatography (enzyme-HPLC method) as described in *Food Nutrition Labeling Standard System,* 2nd Edition (published on Jul. 1, 1999, ed. by Nutrition Food Department/Japan Health Food & Nutrition Food Association, pp. 46-51). More specifically, as the polydextrose (Component (A)) to be used in the packaged beverage containing a vegetable juice and/or a fruit juice according to the present invention, a component having an energy conversion coefficient of 0 (kcal/g) as defined in 1) of Item 1 of Shokushinhatsu No. 0217002 dated 17 Feb., 2003 which is Notification from Director of Office of Health Policy on Newly Developed Foods/Policy Planning Division/Department of Food Safety/Pharmaceutical and Food Safety Bureau/Ministry of Health, Labour and Welfare (partial amendment of "Analysis method of nutrition components in nutrition labeling standards") is usable.

To the packaged beverage containing a vegetable juice and/or a fruit juice according to the present invention, from 0.5 to 12 wt. %, preferably from 1.5 to 10 wt. %, more preferably from 2 to 8 wt. % of the polydextrose can be added. The content of the polydextrose is preferably 0.5 wt. % or greater from the viewpoint of desorption from the wall surface of the beverage container and is preferably 12 wt. % or less from the viewpoint of ease of drinking. The polydextrose content is determined by high performance liquid chromatography (enzyme-HPLC method) described in *Food Nutrition Labeling Standard System,* 2nd Edition (published on Jul. 1, 1999, ed. by Nutrition Food Department/Japan Health Food & Nutrition Food Association, pp. 46-51). In order to remove dietary fibers derived from the insoluble solids, water soluble dietary fibers may be filtered out through a glass filter (No. 2) containing a celite therein as described in *Japanese Society of Nutrition and Food Science,* 46(3), 244(1993). It may be determined with sorbitol contained in Component (A) as an index by using, in combination with the above-described method, an acid, enzyme or the like to cause hydrolysis. At this time, "Litesse Ultra" (product of Danisco Japan), for example, can be used as the internal standard.

As the indigestible dextrin (Component (b1)) to be used in the packaged beverage containing a vegetable juice and/or a fruit juice according to the present invention, usable is a component having an energy conversion coefficient of 2 (kcal/g) as defined in 1) of Item 1 of Shokushinhatsu No. 0217002 dated 17 Feb., 2003 which is Notification from Director of Office of Health Policy on Newly Developed Foods/Policy Planning Division/Department of Food Safety/Pharmaceutical and Food Safety Bureau/Ministry of Health, Labour and Welfare (partial amendment of "Analysis method of nutrition components in nutrition labeling standards").

The degraded guar gum (Component (b2)) to be used in the packaged beverage containing a vegetable juice and/or a fruit juice according to the present invention is a component having an energy conversion coefficient of 2 (kcal/g) as defined in 1) and 2) of Item 1 of Shokushinhatsu No. 0217002 dated 17 Feb., 2003 which is Notification from Director of Office of Health Policy on Newly Developed Foods/Policy Planning Division/Department of Food Safety/Pharmaceutical and Food Safety Bureau/Ministry of Health, Labour and Welfare (partial amendment of "Analysis method of nutrition components in nutrition labeling standards"). Of such degraded guar gums, enzymatically degraded guar gum is usable. As the degraded guar gum, a chemically degraded one is usable as well as an enzymatically degraded one.

The packaged beverage containing a vegetable juice and/or a fruit juice can contain from 0.5 to 12 wt. % of indigestible dextrin or degraded guar gum. The amount of indigestible dextrin is preferably from 1.5 to 10 wt. %, more preferably from 2 to 8 wt. %, while that of the degraded guar gum is preferably from 1.5 to 8 wt. %, more preferably from 2 to 6 wt. %.

The content of indigestible dextrin is preferably 0.5 wt. % or greater from the viewpoint of desorption from the wall surface of the container and not greater than 12 wt. % from the viewpoint of ease of drinking. The content of indigestible dextrin is determined by high performance liquid chromatography (enzyme-HPLC method) described in *Food Nutrition Labeling Standard System,* 2nd Edition (published on Jul. 1, 1999, ed. by Nutrition Food Department/Japan Health Food & Nutrition Food Association, pp. 46-51). In order to remove dietary fibers derived from the insoluble solids, water soluble dietary fibers may be filtered out by using a glass filter (No. 2) having a celite therein as described in *Japanese Society of Nutrition and Food Science,* 46(3), 244(1993). A difference from the value obtained by high performance liquid chromatography (enzyme-HPLC method) may be determined with sorbitol contained in Component (A) as an index by using, in combination with the above-described method, an acid, enzyme or the like to cause hydrolysis. At this time, "Litesse Ultra" (product of Danisco Japan), for example, can be used as the internal standard.

The content of the degraded guar gum is preferably 0.5 wt. % or greater from the viewpoint of desorption from the wall surface of the container and 10 wt. % or less from the viewpoint of ease of drinking. The content of the degraded guar gum is determined by a Prosky method (enzyme-weight method) described in *Nutrition Labeling Standard System,* 2nd Edition (published on Jul. 1, 1999, ed. by Nutrition Food Department/Japan Health Food & Nutrition Food Association, pp. 46-51). In order to remove dietary fibers derived from the insoluble solids, water soluble dietary fibers may be filtered out through a glass filter (No. 2) having a celite therein as described in *Japanese Society of Nutrition and Food Science,* 46(3), 244(1993). A difference from the value obtained by high performance liquid chromatography (enzyme-HPLC method) may be determined with sorbitol contained in Component (A) as an index by using, in combination with the above-described method, an acid, enzyme or the like to cause hydrolysis. At this time, "Litesse Ultra" (product of Danisco Japan), for example, can be used as the internal standard.

The total amount of Components (A) and (B) to be used in the packaged beverage containing a vegetable juice and/or a fruit juice according to the present invention is, when the indigestible dextrin (b) is used as Component (B), about 24 wt. % or less, more preferably 20 wt. % or less, even more preferably 16 wt. % or less per the packaged beverage. When the total amount exceeds about 24 wt. %, the resulting beverage is inferior in ease of drinking. When the degraded guar gum (b2) is used as Component (B), the total amount is preferably 22 wt. % or less, more preferably 19 wt. % or less, even more preferably 16 wt. % or less per packaged beverage. When the total amount exceeds about 22 wt. %, the resulting beverage is not preferred from the viewpoint of ease of drinking.

With regard to Components (A) and (B), when the packaged beverage containing a vegetable juice and/or a fruit juice according to the present invention contains not Component (B) but Component (A), the resulting beverage has undesirable influences such as loose bowels owing to the osmotic pressure of Component (A) in the large intestine. Use of Component (B) in combination makes it possible to reduce undesirable influences such as loose bowels.

In the packaged beverage containing a vegetable juice and/or a fruit juice according to the present invention, a ratio of the total amount of Components (A) and (b1) to the volume of Component (C), that is, the insoluble solid is preferably 8 (wt. %/vol. %), more preferably from 0.05 to 6, even more preferably from 0.1 to 4. By adjusting the ratio of the total amount of Components (A) and (b1) to the volume of Component (C) to not greater than 8, the insoluble solids can be desorbed more smoothly from the wall surface of the container.

In the packaged beverage containing a vegetable juice and/or a fruit juice according to the present invention, the ratio of the total amount of Components (A) and (b2) to the volume of the insoluble solids as Component (C) is preferably 3.4 (wt. %/vol. %), more preferably from 0.05 to 2, even more preferably from 0.1 to 1. By adjusting the ratio of the total amount of Components (A) and (b2) to the volume of Component (C) to not greater than 3.4, the insoluble solids can be desorbed more smoothly from the wall surface of the container.

The packaged beverage containing a vegetable juice and/or a fruit juice according to the present invention has a pH, after heat sterilization, of preferably from 3 to 5, more preferably from 3.5 to 4.6, even more preferably from 3.8 to 4.5 from the viewpoints of storage stability and ease of drinking. The pH is adjusted prior to the heat sterilization. For the pH adjustment, additives such as organic acids, salts of organic acids, inorganic acids, salts of inorganic acids, inorganic salts, and pH regulators may be added either singly or in combination, depending on the components derived from the vegetable juice and/or fruit juice. An adequate amount of the additive is added for pH adjustment directly or as an aqueous solution obtained by diluting the additive to a proper concentration. The additive or aqueous solution thereof may be added while checking the pH by a pH meter or the like. Examples of the additive include adipic acid, citric acid, gluconic acid, succinic acid, acetic acid, tartaric acid, lactic acid, fumaric acid, malic acid and ascorbic acid, and salts thereof. When heat sterilization causes a pH change, the adjustment of pH before heat sterilization may be carried out with the change taken into consideration.

The viscosity of the packaged beverage containing a vegetable juice and/or a fruit juice according to the present invention after heat sterilization is preferably 300 mPa·s or less, more preferably from 1 to 250 mPa·s, even more preferably from 2 to 225 mPa·s, even more preferably from 3 to 200 mPa·s.

The vegetable beverage contained in the packaged beverage containing a vegetable juice and/or a fruit juice according to the present invention is, for example, a beverage corresponding to the vegetable beverages 1) to 8) of (7) described in pp. 12 to 13 of *Latest Edition of Soft Drinks* (published on Sep. 30, 2003, ed. by Editorial Committee of Latest Edition of Soft Drinks, published by Korin). More specifically, they are 1) tomato juice, 2) tomato mixed juice, 3) tomato fruit beverage, 4) carrot juice, 5) carrot mixed juice, 6) vegetable juice, 7) vegetable-fruit mixed juice, and 8) other vegetable beverages.

The fruit beverage in the packaged beverage containing a vegetable juice and/or a fruit juice according to the present invention is a beverage corresponding to fruit beverages 1) to 8) of (2) described in pp. 10 to 11 of *Latest Edition of Soft Drinks* (published on Sep. 30, 2003, ed. by Editorial Committee of Latest Edition of Soft Drinks, published by Korin). More specifically, they are 1) fruit juice, 2) fruit mixed juice, 3) fruit-juice-containing beverage, 4) fruit-pulp-containing beverage, 5) fruit-granule-containing beverage, 6) fruit-juice-containing mixed beverage, 7) fruit-juice-containing carbonated beverage, and 8) other undiluted beverages. Beverages described in ibid, pp. 10 to 11, that is, 9) diluted beverage and 10) fruit syrup are excluded definitely from the fruit beverages. The beverage of the present invention is more preferably any one of the above-described beverages except the other undiluted beverages 8), that is, the beverages 1) to 7).

The mixture of the above-described vegetable juice beverage and fruit juice beverage is also embraced in the present invention.

As a beverage container used for the packaged beverage containing a vegetable juice and/or a fruit juice according to the present invention, ordinarily employed ones such as a molded container (so-called PET bottle) composed mainly of polyethylene terephthalate, a metal can, a paper container laminated with a metal foil or plastic film and a bottle can be used. A package having a lower oxygen permeability than that of a paper container is preferred. The oxygen permeability at 22° C. of the container is from 0.0001 to 0.1 mL/350 mL·day·atom, preferably from 0.0005 to 0.008 mL/350 mL·day·atom, more preferably from 0.001 to 0.06 mL/350 mL·day·atom, even more preferably from 0.0015 to 0.04 mL/350 mL·day·atom. Oxygen permeable colored containers are usable insofar as they are transparent. Transparent containers which permit observation of the deposition of precipitates therein are preferred. The term "transparent container" means a container which substantially permits visual observation of the presence or absence of a precipitate on the bottom of the container.

The packaged beverage containing a vegetable juice and/or a fruit juice according to the present invention may contain additives such as antioxidants, flavors, various esters, organic acids, salts of organic acids, inorganic acids, salts of inorganic acids, inorganic salts, colorants, emulsifiers, preservatives, seasonings, pH regulators and quality stabilizers, depending on the components derived from the vegetable juice and/or a fruit juice. These additives may be used either singly or in combination.

The packaged beverage containing a vegetable juice and/or a fruit juice according to the present invention can be prepared by filling the beverage in a container such as a metal can and then sterilizing it, if it can withstand heat sterilization, under conditions as specified by the Food Sanitation Law. When the container cannot withstand retort sterilization, for example, a PET bottle or paper container, employed is a method of sterilizing the beverage under similar sterilization conditions to those described above in advance, for example, by subjecting the beverage to high-temperature short-time sterilization on a plate type heat exchanger, cooling it to a predetermined temperature and then, filling it in the container. At this time, the beverage may be filled in the container under sterile conditions. It is also possible to add, to some components already filled in a container under sterile conditions, another component under sterile conditions. After heat sterilization under acidic conditions, the pH of the beverage may be returned to neutral under sterile conditions, or after heat sterilization under neutral conditions, the pH of the beverage may be returned to acidic under sterile conditions.

EXAMPLES

Preparation Process of Packaged Beverage

Example 1

An aqueous solution having a total weight of 50 g was prepared by dissolving 2.0 g, as an effective amount, of heat-treated polydextrose and 1.5 g, as an effective amount, of indigestible dextrin in water. The resulting aqueous solution was mixed with 50 g of a double concentrated tomato juice having an adjusted insoluble solid content to prepare 100 g of a mixed solution. After 90 mL of the mixed solution was filled in a threaded tube (borosilicate glass, volume: 110 mL, tube diameter: 40.0 mm, overall length: 120 mm, inner diameter of inlet: 20.0 mm, product of Maruemu Corporation, Model No. 8), the tube was hermetically sealed with a cap, followed by sterilization under sterilization conditions of 85° C. for 40 minutes. Immediately after the sterilization, cooling was performed with water until the temperature became normal temperature.

In Examples 2 to 7 and Comparative Examples 1 to 3, a mixed solution was obtained by adjusting the amounts of polydextrose, indigestible dextrin and degraded guar gum as shown in Tables 1 and 2, followed by sterilization under similar conditions to those employed in Example 1. In Examples 1 and 4 and Comparative Example 2, a double-concentrated tomato juice (1) adjusted so that the insoluble solid content would be 15 vol. % was used; in Comparative Examples 1 and 3, a double-concentrated tomato juice (2) adjusted so that the insoluble solid content of the packaged beverage would be 1 vol. % was used; in Example 3, a double-concentrated tomato juice (3) adjusted so that the insoluble solid content of the packaged beverage would be 10 vol. % was used; in Example 3, a double-concentrated tomato juice (4) adjusted so that the insoluble solid content of the packaged beverage would be 11 vol. % was used; in Examples 5 and 6, double-concentrated tomato juices (5) and (6) adjusted so that the insoluble solid content of the packaged beverage would be 8 vol. % was used; and in Example 7, a double-concentrated tomato juice (7) adjusted so that the insoluble content of the packaged beverage would be 12 vol. % was used.

Polydextrose: "Litesse Ultra" (product of Danisco Japan)

Indigestible dextrin: "Fibersol 2" (product of Matsutani Chemical Industry)

Degraded guar gum: "Sunfiber R" (product of Taiyo Kagaku)

(Determination Method of the Insoluble Solid Content)

In a centrifugal precipitation tube for analyzing an insoluble solid content as defined by the insoluble solid analyzing method described in Japanese Agricultural Standards Association Test Methods (*Latest Fruit juice•Fruit Drink Dictionary*, pp. 566 to 575, published by Asakura Shoten), a 10 mL portion of the vegetable-juice- and/or fruit-juice-containing beverage of the packaged beverage according to the present invention is charged. It is centrifuged for exactly 30 minutes in a centrifugal separator having a turning radius of 14.5 cm after the rotation speed of the separator reaches 3000 rpm. From the centrifugal precipitation tube, 5 mL of the supernatant is withdrawn, 5 mL of distilled water is added and then centrifugation is performed for exactly 30 minutes in a centrifugal separator having a turning radius of 14.5 cm after the rotation speed of the separator reaches 3000 rpm. From the centrifugal precipitation tube, 5 mL of the supernatant is withdrawn, 5 ml of distilled water is added and then centrifugation is performed in a centrifugal separator having a rotation radius of 14.5 cm for exactly 30 minutes after its rotation speed reaches 3000 rpm. The above-described operations are carried out at 20° C. The volume of the precipitate from the bottom to the average upper end of the centrifugal precipitation tube rightly after the centrifugal separator stops naturally is designated as the insoluble solid content.

(Determination Method of the Water Content)

The water content was determined by a heat drying method at 105° C. for 2 hours under normal pressure.

(Determination Method of the Contents of the Polydextrose, Indigestible Dextrin and Degraded Guar Gum)

For determination of the contents of the polydextrose and indigestible dextrin, high performance liquid chromatography (enzyme-HPLC method) was used and for determination of the content of the degraded guar gum, a Prosky method (enzyme-weight method) was used. These methods are described in *Food Nutrition Labeling Standard System*, 2nd Edition (published on Jul. 1, 1999, ed. by Nutrition Food Department/Japan Health Food & Nutrition Food Association, pp. 46-51).

(Measuring Method of the pH after Heat Sterilization)

After the temperature of the sample was adjusted to 20° C., its pH was measured using a pH meter ("F-22", product of Horiba, Ltd).

(Measuring Method of Viscosity after Heat Sterilization)

After the temperature of the sample was adjusted to 20° C., its viscosity was measured using a B8L viscometer, product of Tokimec (rotor: No. 1, rotation speed: 60 rpm).

(Evaluation Method of Desorption)

The packaged beverages obtained in the Examples and Comparative Examples were evaluated after being left standing under storage conditions of 25° C. for 10 days. The beverage container standing upright was laid sideways at an angular velocity of 90°/2 seconds and was continuously turned upside down at an angular velocity of 90°/2 seconds. While the container was allowed to stand for 20 seconds while being turned upside down, the first evaluation on desorption was performed. The desorption was evaluated by visually observing the state of the beverage on the bottom of the container. After allowing the container to stand for 20 seconds, the container was turned in the opposite direction to an upright position again at an angular velocity of 90°/2 seconds. The evaluations on and after the second evaluation were performed in accordance with the first evaluation method. With regard to a time interval between two desorption evaluations (for example, a time interval between the first desorption evaluation and the second desorption evaluation), the container which was turned to an upright position again was then provided for the next evaluation without a pose.

(Evaluation Method of Re-Dispersibility)

Re-dispersibility of the beverage was evaluated simultaneously with the observation of the third desorption evaluation.

(Evaluation Standards of Desorption)

| | |
|---|---|
| A loop of precipitates on the bottom of the container (at the periphery of the bottom) is continuous | E |
| From 50% or greater but not less than 100% of a loop of precipitates on the bottom of the container is continuous | D |
| From 20% or greater but not less than 50% of a loop of precipitates on the bottom of the container is continuous | C |
| Less than 20% of a loop of precipitates exists on the bottom of the container | B |
| No loop of precipitates exists on the bottom of the container | A |

(Evaluation Standards of Re-Dispersibility)

| | |
|---|---|
| A lump of precipitates is at least as big as a grain of rice. | D |
| A lump of precipitates is smaller than a grain of rice and has a size of a sesame seed. | C |
| A lump of precipitates is smaller than a sesame seed and has a size of a fine particle. | B |
| No lump is recognized. | A |

TABLE 1

| | | Ex. 1 | Ex. 2 | Ex. 3 | Comp. Ex. 1 | Comp. Ex. 2 |
|---|---|---|---|---|---|---|
| <Formulation> | | | | | | |
| Tomato juice (1) | wt. % | 91 | | | | 100 |
| Tomato juice (2) | wt. % | | | | 100 | |
| Tomato juice (3) | wt. % | | 91 | | | |
| Tomato juice (4) | wt. % | | | 47.1 | | |
| Fruit juice mixture (1) | wt. % | | | 43.9 | | |
| Polydextrose (A) | wt. % | 8 | 1 | 8 | | |
| Indigestible dextrin (b1) | wt. % | 1 | 8 | 1 | | |
| Total amount | wt. % | 100 | 100 | 100 | 100 | 100 |
| <Physical properties> | | | | | | |
| Insoluble solids (C) | vol. % | 15 | 10 | 11 | 1 | 15 |
| Water content | wt. % | 85.2 | 85 | 84.4 | 96.3 | 96.1 |
| Viscosity after sterilization | mPa·s | 130.5 | 132 | 95.8 | 3.5 | 112.5 |
| pH after sterilization | — | 4.4 | 4.3 | 4.2 | 4.4 | 4.3 |
| (A + b1)/C | wt. %/vol % | 0.6 | 0.9 | 0.82 | 0 | 0 |
| Evaluation results> | | | | | | |
| First evaluation of desorption | | D | B | E | E | E |

TABLE 1-continued

|  | Ex. 1 | Ex. 2 | Ex. 3 | Comp. Ex. 1 | Comp. Ex. 2 |
|---|---|---|---|---|---|
| Second evaluation of desorption | D | B | B | E | E |
| Third evaluation of desorption | C | B | B | E | D |
| Fourth evaluation of desorption | B | B | B | D | C |
| Re-dispersibility | A | B | B | A | A |

* The fruit juice mix (1) was prepared by mixing 1000 g of "Yasai Seikatsu 100" (product of Kagome), 10 g of "Aloe 1/5" (product of Tokyo Food Techno), 10 g of "Orange & Mikan 100% Juice" (product of Glico) and 10 g of "Momo Juice Kaju 20%" (product of Koiwai), and adding water to the resulting mixture to adjust its Brix to 5.9. The tomato juice (4) used in Example 4 had a Brix adjusted to 5.9. "Yasai Seikatsu 100" contained carrot, spinach, parsley, celery, cabbage, lemon and apple. The insoluble solids derived from tomatoes in the beverage was 33 vol. %.

As is apparent from Table 1, it has been found that the beverages of Comparative Examples 1 and 2 not containing any of polydextrose, indigestible dextrose and degraded guar gum is inferior in the desorption of precipitates from the bottom of the container in spite of not a large insoluble solid content, while the beverages obtained in Examples 1 to 3 containing polydextrose and indigestible dextrin exhibit improved desorption.

TABLE 2

|  |  | Ex. 4 | Ex. 5 | Ex. 6 | Ex. 7 | Comp. Ex. 3 |
|---|---|---|---|---|---|---|
| <Formulation> |  |  |  |  |  |  |
| Tomato juice (1) | wt. % | 96.5 |  |  |  |  |
| Tomato juice (2) | wt. % |  |  |  |  | 96.5 |
| Tomato juice (5) | wt. % |  | 90.5 |  |  |  |
| Tomato juice (6) | wt. % |  |  | 32.1 |  |  |
| Tomato juice (7) | wt. % |  |  |  | 47.6 |  |
| Fruit juice mixture (2) | wt. % |  |  | 59.9 |  |  |
| Fruit juice mixture (3) | wt. % |  |  |  | 44.4 |  |
| Polydextrose (A) | wt. % | 2 | 1.5 | 6.5 | 6.5 | 2 |
| Degraded guar gum (b2) | wt. % | 1.5 | 8 | 1.5 | 1.5 | 1.5 |
| Total amount | wt. % | 100 | 100 | 100 | 100 | 100 |
| <Physical properties> |  |  |  |  |  |  |
| Insoluble solids (C) | vol. % | 15 | 8 | 8 | 12 | 1 |
| Water content | wt. % | 92.8 | 86 | 86.6 | 85 | 93.3 |
| Viscosity after sterilization | mPa · s | 114 | 79.6 | 23.4 | 117.5 | 4.4 |
| pH after sterilization |  | — | 4.3 | 4.5 | 4.2 | 4.4 |
| (A + b2)/C | wt. %/vol % | 0.23 | 1.18 | 1 | 0.67 | 3.5 |
| <Evaluation results> |  |  |  |  |  |  |
| First evaluation of desorption |  | D | A | C | D | D |
| Second evaluation of desorption |  | D | A | B | D | D |
| Third evaluation of desorption |  | C | A | B | B | D |
| Fourth evaluation of desorption |  | B | A | A | B | C |
| Re-dispersibility |  | A | A | A | B | A |

* The fruit juice mix (2) was prepared by mixing 1000 g of "Yasai Seikatsu 100" (product of Kagome), 10 g of "Aloe 1/5" (product of Tokyo Food Techno), 10 g of "Orange & Mikan 100% Juice" (product of Glico) and 10 g of "Momo Juice Kaju 20%" (product of Koiwai), and adding water to the resulting mixture to adjust its Brix to 4.3.
The tomato juice (6) used in Example 6 had a Brix adjusted to 4.3. "Yasai Seikatsu 100" contained carrot, spinach, parsley, celery, cabbage, lemon and apple. The insoluble solid content derived from tomatoes in the beverage was 19 vol. %.
* The fruit juice mix (3) was prepared by mixing 1000 g of "Yasai Seikatsu 100" (product of Kagome), 10 g of "Aloe 1/5" (product of Tokyo Food Techno), 10 g of "Orange & Mikan 100% Juice" (product of Glico) and 10 g of "Momo Juice Kaju 20%" (product of Koiwai), and adding water to the resulting mixture to adjust its Brix to 5.8.
The tomato juice (4) used in Example 4 had a Brix adjusted to 5.8.
The tomato juice (7) used in Example 7 had a Brix adjusted to 5.8. "Yasai Seikatsu 100" contained carrot, spinach, parsley, celery, cabbage, lemon and apple. The insoluble solid content derived from tomatoes in the beverage was 33 vol. %.

It has been found from Tables 1 and 2 that the beverages obtained in Comparative Examples 1 and 2 not containing any of polydextrose, indigestible dextrin and degraded guar gum exhibited inferior desorption of precipitates deposited to the bottom of the container, while packaged beverages obtained in Examples 4 to 7 containing both polydextrose and degraded guar gum exhibited improved desorption. It has also been found that it is difficult to improve the desorption of the packaged beverage obtained in Comparative Example 3 having a small insoluble solid content even if it contained both polydextrose and degraded guar gum.

The invention claimed is:

1. A packaged beverage containing a vegetable juice and/or a fruit juice, which comprises the following components (A) to (D):
   (A) from 0.5 to 12 wt. % of polydextrose,
   (B) from 0.5 to 12 wt. % of (b1) indigestible dextrose or (b2) a degraded guar gum,
   (C) from 2 to 30 vol. % of an insoluble solid, and
   (D) 50 wt. % or greater of water;
   wherein the following conditions are satisfied:
   (1) $0.1 \leq ((A)+(b1))/(C) \leq 4$ (wt. %/vol. %) or $0.05 \leq ((A)+(b2))/(C) \leq 2$ (wt. %/vol. %),
   (2) a pH after a heat sterilization is from 3 to 5, and (3) a viscosity after a heat sterilization is 300 mPa·s or less.

2. The packaged beverage according to claim 1, which contains, as the vegetable juice, a juice of one or more vegetables selected from the group consisting of tomato, spinach, carrot, parsley, celery, cabbage and aloe.

3. The packaged beverage according to claim 1 or 2, which contains, as the fruit juice, a juice of one or more fruits selected from the group consisting of lemon, apple, mandarin orange, orange and peach.

4. The packaged beverage according to claim 1, wherein the packaged beverage is either one of a vegetable beverage or vegetable•fruit juice mixed beverage.

5. The packaged beverage according to claim 1, wherein the container of the packaged beverage is a transparent container.

6. The packaged beverage according to claim 1, wherein the container of the packaged beverage has an oxygen permeability of from 0.0001 to 0.1 mL/350 mL·day·atm.

* * * * *